(12) United States Patent
Chien (10) Patent No.: US 10,791,865 B2
(45) Date of Patent: Oct. 6, 2020

(54) ICE-WATER DRIPPING-RATE ADJUSTER FOR DRIP-TYPE ICE COFFEE MAKER

(71) Applicant: Hao Yi Chien, New Taipei (TW)

(72) Inventor: Hao Yi Chien, New Taipei (TW)

( * ) Notice: Subject to any disclaimer, the term of this patent is extended or adjusted under 35 U.S.C. 154(b) by 593 days.

(21) Appl. No.: 15/643,880

(22) Filed: Jul. 7, 2017

(65) Prior Publication Data
US 2018/0014688 A1    Jan. 18, 2018

(30) Foreign Application Priority Data

Jul. 14, 2016 (TW) .............................. 105210652 U (51) Int. Cl.
  *A47J 31/06* (2006.01)
  *A47J 31/46* (2006.01)
  *A47J 31/02* (2006.01)

(52) U.S. Cl.
  CPC ........... *A47J 31/0621* (2013.01); *A47J 31/02* (2013.01); *A47J 31/461* (2018.08)

(58) Field of Classification Search
  None
  See application file for complete search history.

(56) References Cited

U.S. PATENT DOCUMENTS

| | | | | |
|---|---|---|---|---|
| 4,056,050 A | * | 11/1977 | Brown | A47J 31/0573 99/305 |
| 4,697,502 A | * | 10/1987 | English | A47J 31/0621 99/299 |
| 2009/0159595 A1 | * | 6/2009 | Michaelian | A47G 19/2272 220/260 |
| 2013/0206014 A1 | * | 8/2013 | Jarisch | A47J 31/407 99/295 |
| 2015/0257588 A1 | * | 9/2015 | Stein | A47J 31/462 426/433 |
| 2015/0305544 A1 | * | 10/2015 | Lancey | A47J 31/0621 426/431 |

FOREIGN PATENT DOCUMENTS

CN         103190831 B   *   6/2015

* cited by examiner

*Primary Examiner* — Ibrahime A Abraham
*Assistant Examiner* — Elizabeth M Sims
(74) *Attorney, Agent, or Firm* — Birch, Stewart, Kolasch & Birch, LLP (57) ABSTRACT

An ice-water dripping-rate adjuster for a drip-type ice coffee maker includes: a dripping valve having an upper valve member and a lower valve member, an upper coupling member secured with the upper valve member and having an ice-water container fixed on the upper coupling member for storing ice and ice water in the ice-water container, a lower coupling member rotatably engageable with the upper coupling member and secured with the lower valve member, with the lower coupling member having a coffee jug secured to the lower coupling member, whereby the ice water is downwardly dripped for adjusting its dripping rate by the dripping valve and is brewed through a ground coffee canister, which is mounted in an upper portion of the coffee jug, to make a drip ice coffee to be received in the jug.

12 Claims, 9 Drawing Sheets

ICE-WATER DRIPPING-RATE ADJUSTER FOR DRIP-TYPE ICE COFFEE MAKER

RELATED APPLICATION

This application claims the benefit of a Taiwanese patent application, 105210652, filed on Jul. 14, 2016, the specification of which is incorporated here by this reference.

BACKGROUND OF THE INVENTION

Figure 1:
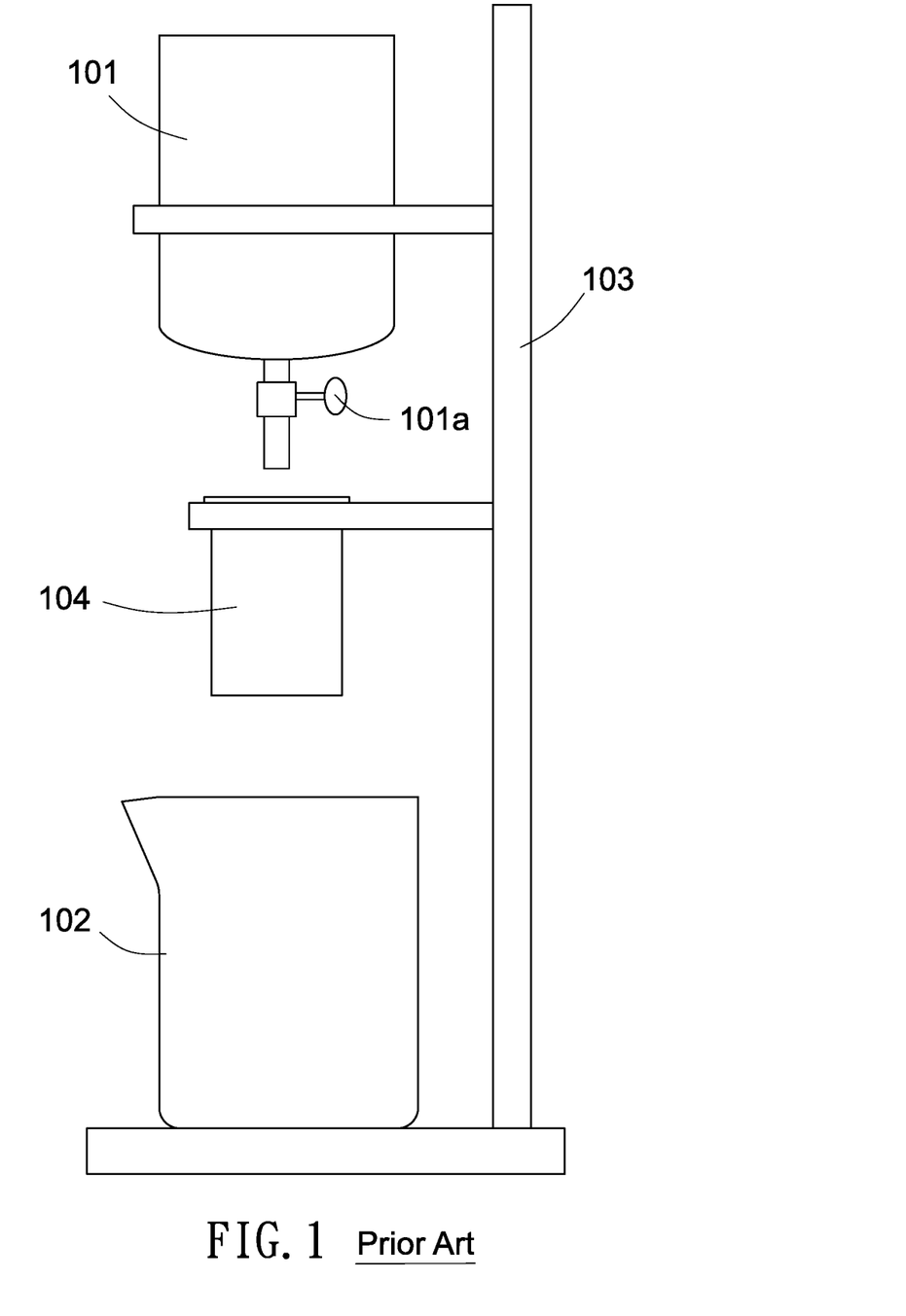
FIG. 1 shows a first conventional drip-type ice coffee maker.

As shown in FIG. 1, a conventional drip-type ice coffee maker includes: an upper container 101 for storing ice and ice water therein and secured on an upper portion of a stand 103, a valve 101a formed on a vertical drain tube of the upper container for dripping ice water through a ground coffee container 104 mounted on a middle portion of the stand 103, and a coffee receiving container 102 placed on a lower portion of the stand 103 for receiving the dripped ice coffee as downwardly passing through the ground coffee container.

However, such a conventional coffee maker has the following drawbacks:
1. The valve 101a and the coffee container 102 are all exposed to the atmosphere, easily being contaminated by external pollutants to influence drink hygiene.
2. Whenever adjusting the ice water draining rate, the user's hand or fingers should carefully operate the valve 101a as blockaded by the containers and the stand 103, being quite inconvenient for the user.

Figure 2:
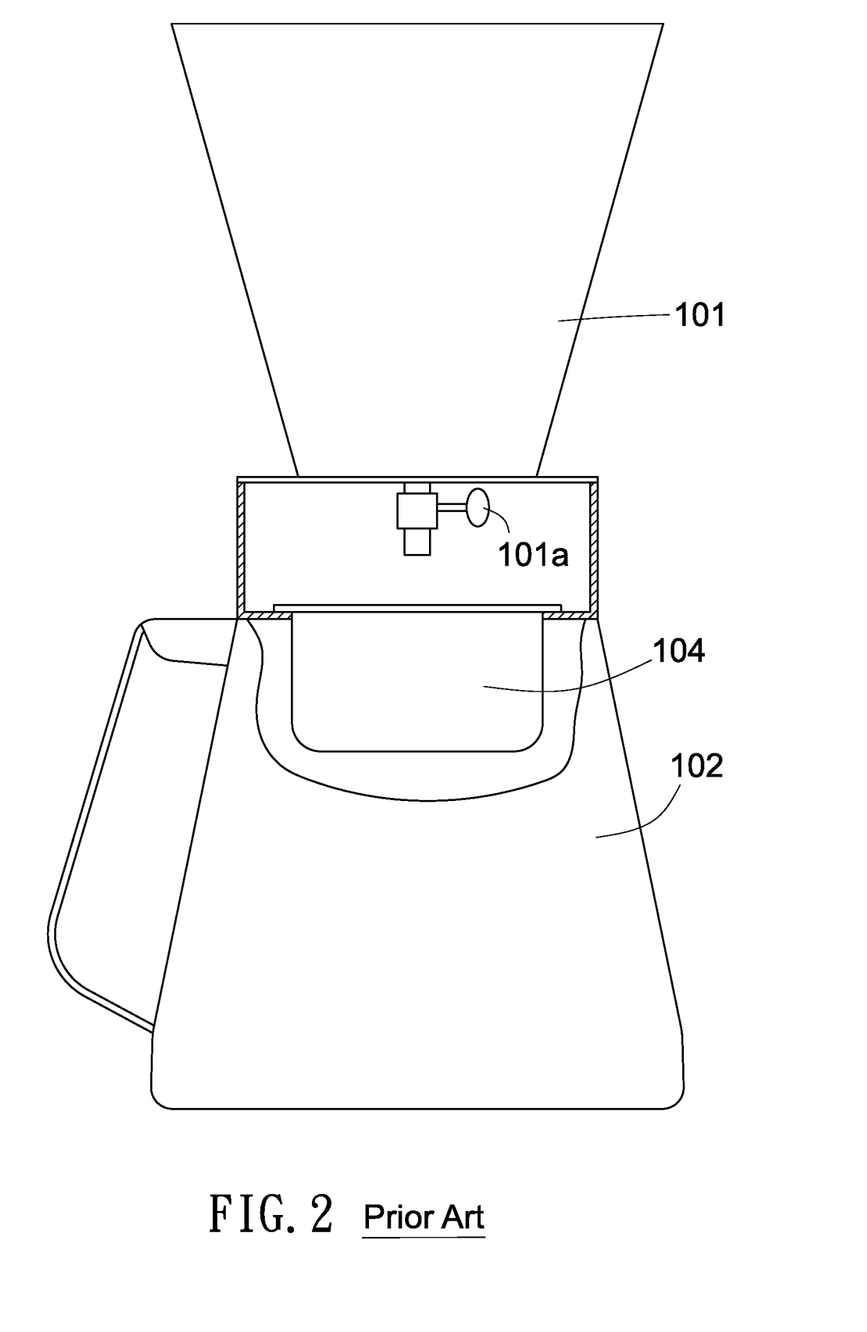
FIG. 2 shows a second conventional drip-type ice coffee maker.
Figure 3:
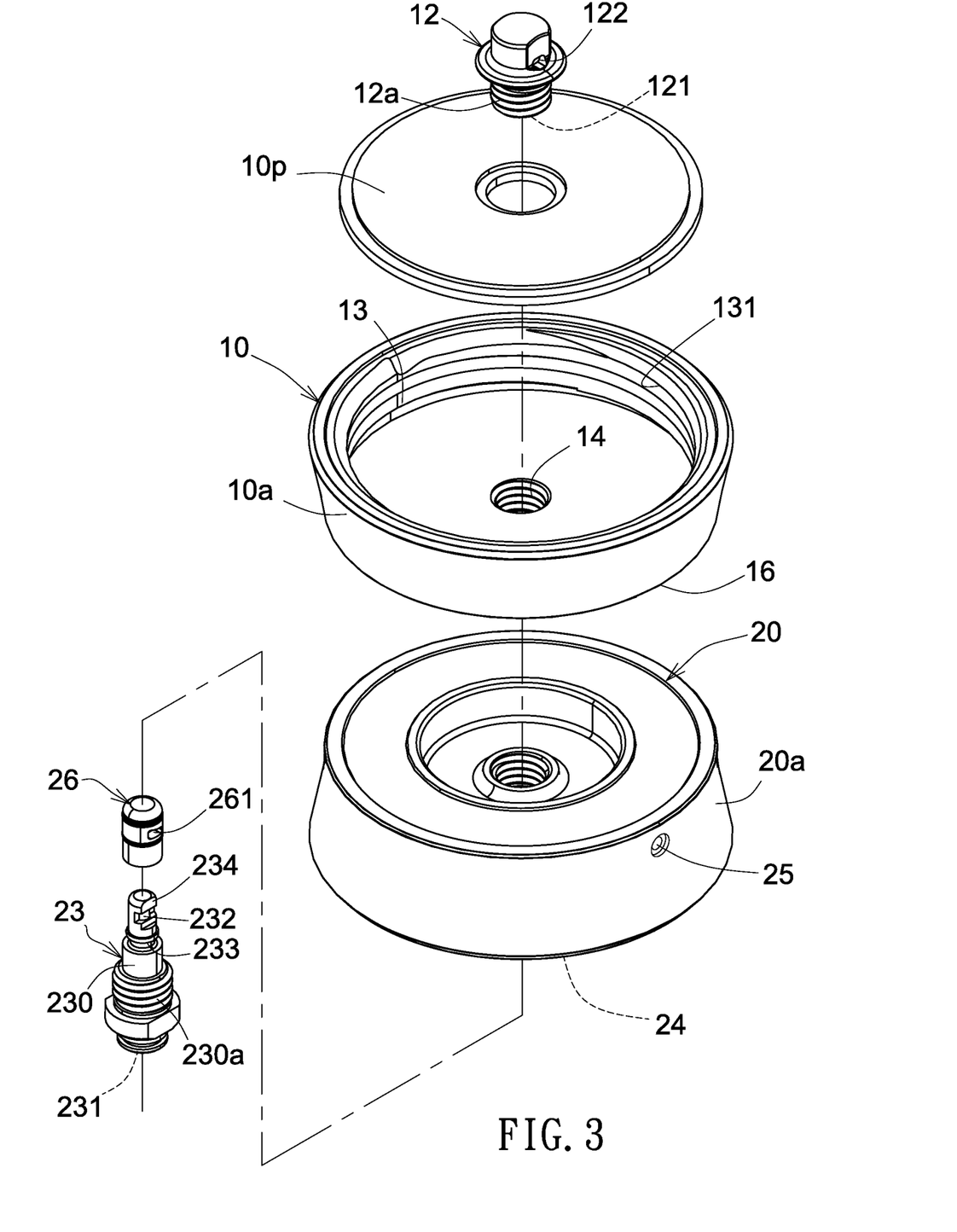
FIG. 3 is an exploded view of the present invention.

Another conventional drip-type ice coffee maker is shown in FIG. 2, and includes: an upper ice container 101 placed on top of a lower coffee container 102, a valve 101a inserted into an upper chamber of the lower container 102, and a ground coffee container 104 secured on an upper portion of the lower container 102.

However, it still has the following drawbacks:
1. The valve 101a as positioned in between the upper container 101 and the containers 104, 102 is quite inconveniently operated when adjusting the ice water draining rate, since the upper container must be first removed or separated from the lower containers.
2. During the adjustment of the valve 101a by removing or separating the related containers, contamination may be easily caused, such as an accidental dripping of coffee drops on the table or ground.

The present inventor has found the drawbacks of the conventional drip coffee makers, and invented the present ice water dripping adjuster for hygienically and conveniently adjusting a dripping rate of the ice water for the coffee maker.

SUMMARY OF THE INVENTION

The object of the present invention is to provide an ice-water dripping-rate adjuster for a drip-type ice coffee maker includes: a dripping valve having an upper valve member and a lower valve member, an upper coupling member secured with the upper valve member and having an ice-water container fixed on the upper coupling member for storing ice and ice water in the ice-water container, a lower coupling member rotatably engageable with the upper coupling member and secured with the lower valve member, with the lower coupling member having a coffee jug secured to the lower coupling member, whereby the ice water is downwardly dripped for adjusting its dripping rate by the dripping valve and is brewed through a ground coffee canister, which is mounted in an upper portion of the coffee jug to make a drip ice coffee to be received in the jug.

DETAILED DESCRIPTION

Figure 6:
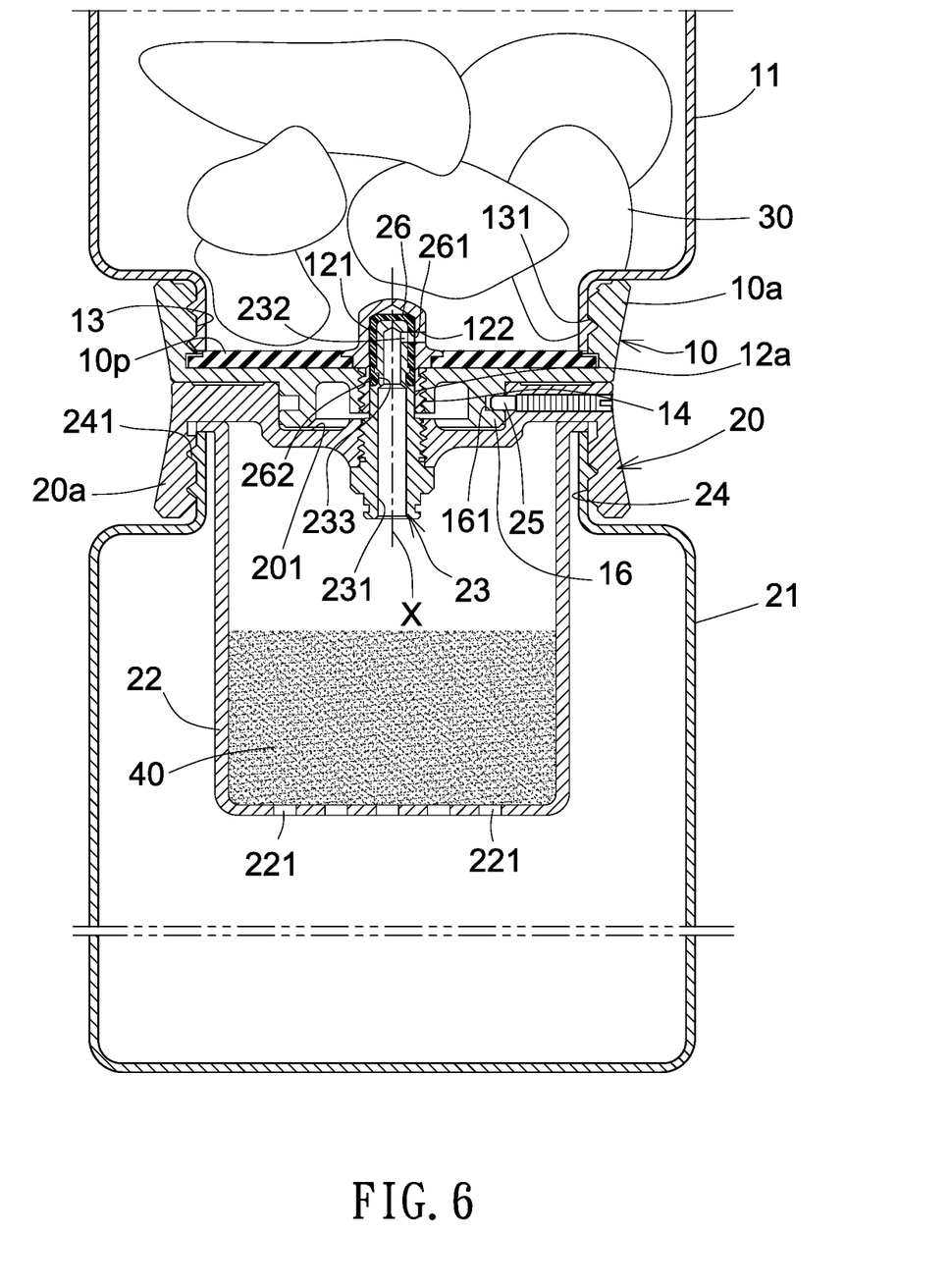
FIG. 6 is a sectional drawing showing the ice coffee brewed in accordance with the present invention.

As shown in FIGS. 3-6, the present invention comprises: a dripping valve means 100 consisting of an upper valve member 12 and a lower valve member 23; an upper coupling member 10 having a basin 10a circumferentially disposed about the upper valve member 12 and a shaft 16 protruding downwardly from the basin 10a; a lower coupling member 20 having a socket member 20a circumferentially disposed about the lower valve member 23 and a recess 201 recessed downwardly in the socket member 20a to be rotatably engageable with the shaft 16 of the basin 10a of the upper coupling member 10; whereby the upper coupling member 10 is mounted with an ice (or ice water) container 11 having ice 30 stored therein for dripping ice water as melted from ice 30 downwardly for controlling or adjusting the dripping rate of ice water by the dripping valve means 100, and the lower coupling member 20 is mounted on a coffee jug 21 having a ground coffee canister 22 for storing ground coffee 40 therein secured on an upper portion of the coffee jug 21, whereby the ice water as downwardly dripped will extract the ground coffee in the canister 22 to brew an ice coffee through the ground coffee canister 22, and the brewed ice coffee is then received in the coffee jug 21 as shown in FIG. 6.

The ground coffee canister 22 is formed with a plurality of dripping holes 221 in a bottom of the canister to drain the brewed ice coffee into the jug 21 through the holes 221.

The upper valve member 12 of the dripping valve means 100 includes: a male-threaded portion 12a engaged with a female-threaded hole 14 formed in the basin 10a, a sheath 121 protruding upwardly from the male-threaded portion 12a and axially protruded above a bottom plate 10p of the basin 10a to be engaged with the lower valve member 23, and an outer horizontal hole 122 radially formed through the sheath 121 to lead the ice water as melted from the ice 30 stored in the ice container 11 inwardly to be dripped downwardly through the lower valve member 23, which will be described hereinafter.

The basin 10a of the upper valve member 12 is formed with female-threaded hole 131 to be engaged with a male-threaded portion formed on a neck portion of the ice container 11 to thereby secure the ice container 11 with the basin 10a firmly.

The bottom plate 10p may be formed with an elastomer to be a sealing packing between the sheath 121 of the upper valve member 12, and the basin 10a of the upper coupling member 10 to prevent outward leakage of ice water.

The dripping valve means 100 is axially mounted in a central portion of the upper and lower coupling members 10, 20 about a longitudinal axis X defined in a longitudinal center of the upper and lower coupling members 10, 20. About the axis X, the upper and lower coupling members 10, 20 are rotatably engageable with each other.

The lower coupling member 20 includes a socket member 20a having a lower cavity 24 formed with female-threaded hole 241 therein to be engaged with a male-threaded portion formed on an upper portion of the coffee jug 21 to secure the coffee jug 21 with the socket member 20a of the lower coupling member 20. The shapes or forms of ice (or ice water) container 11 and the coffee jug 21 may not be limited. A Mason jar may be used, for instance.

The lower valve member 23 includes: a valve stem 230 having a male-threaded portion 230a formed on a lower portion of the valve stem 230 to be engaged with a female-threaded hole formed in the socket member 20a, a vertical hole 231 formed in the valve stem 230, an inner horizontal hole 232 horizontally formed through an upper portion of the valve stem 230, a packing sleeve 26 jacketed on a top portion of the valve stem 230 and positioned between the valve stem 230 and the sheath 121 of the upper valve member 12 and having a middle horizontal hole 261 formed through the sleeve 26 and fluidically communicated with the inner horizontal hole 232 in the valve stem 230 and communicated with the outer horizontal hole 122 in the upper valve member 12 when opening the valve means 100 of the present invention.

The packing sleeve 26 is formed with a flange 262 to be engaged with a flange groove 233 formed in the valve stem 230 to fix the packing sleeve 26 on the valve stem 230. The top portion of the valve stem 230 is formed with a flat or secant surface portion 234 to be engaged with a corresponding flat surface portion 263 in the packing sleeve 26 (FIG. 7) to thereby prevent a free rotation of the packing sleeve 26 about the valve stem 230. The middle horizontal hole 261 of the packing sleeve 26 is constantly aligned with the inner horizontal hole 232 in the valve stem 230. When the outer horizontal hole 122 of the upper valve member 12 is fluidically communicated or aligned with the middle horizontal hole 261, and the inner horizontal hole 232, the ice water as melted from the ice 30 as stored in the ice container 30 will flow through the outer hole 122, the middle hole 261 and the inner hole 232 to be drained into the vertical hole 231 in the valve stem 230.

Figure 4:
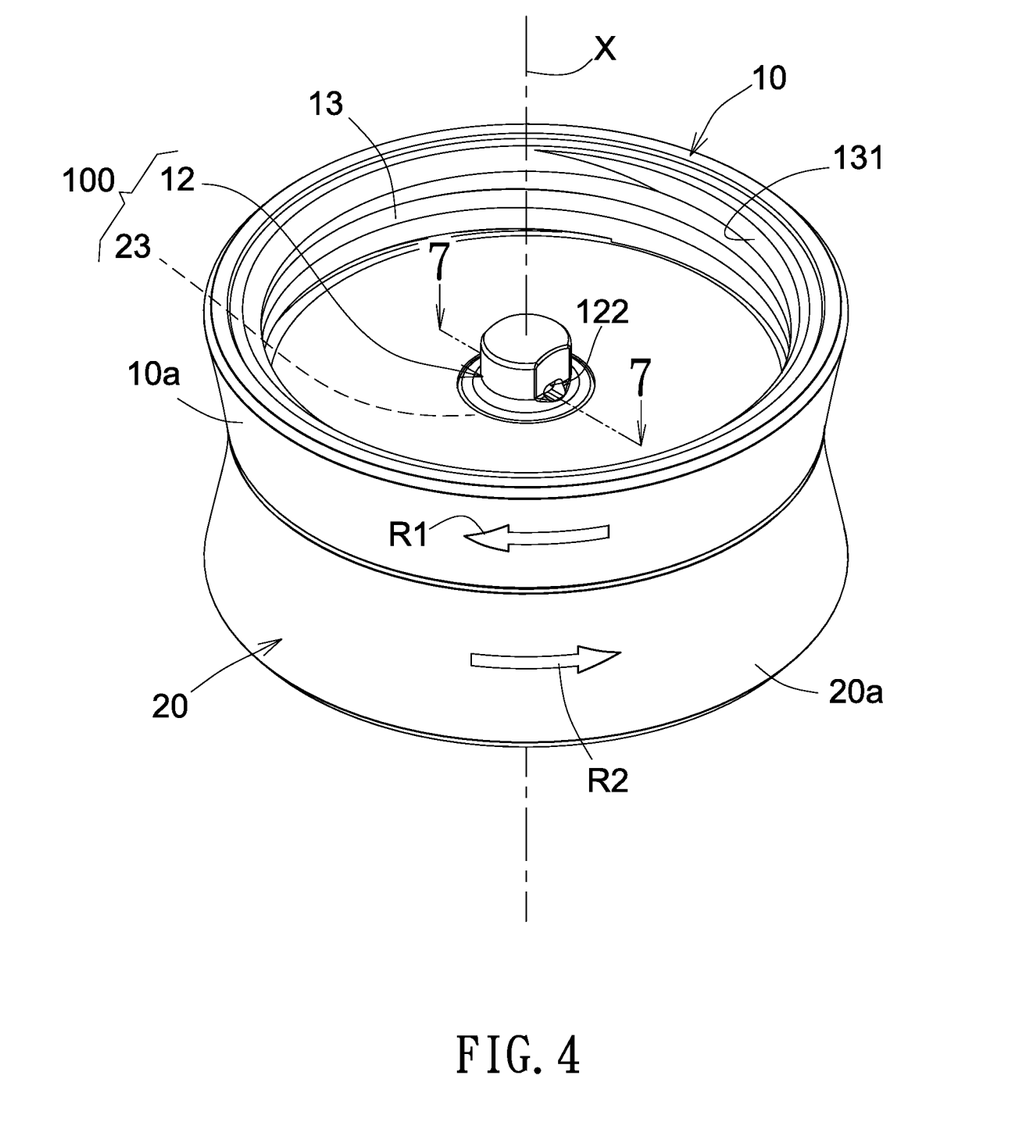
FIG. 4 is a perspective view of the present invention when assembled from FIG. 3.
Figure 5:
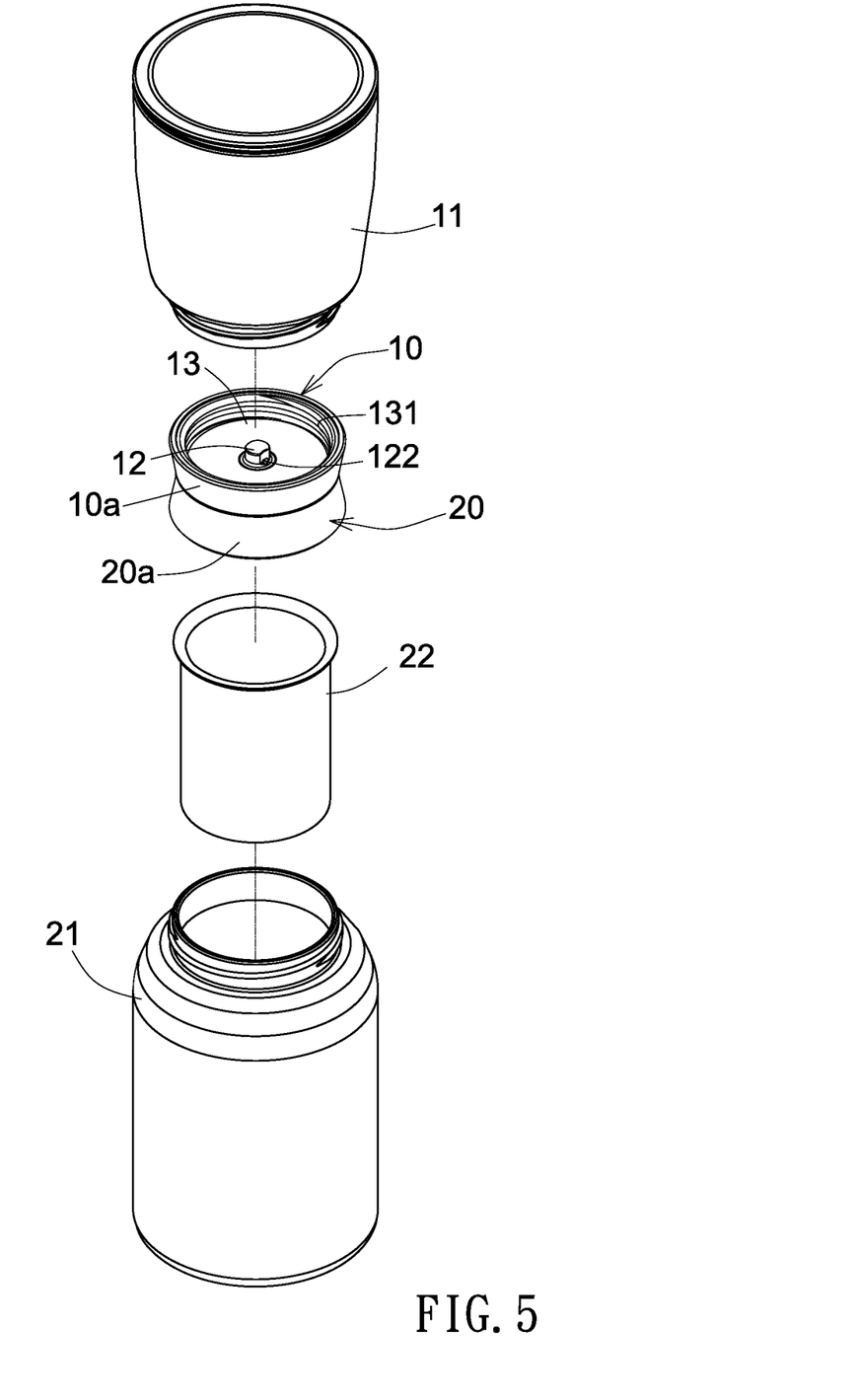
FIG. 5 is an illustration showing an application example of the present invention when disassembled.
Figure 8:
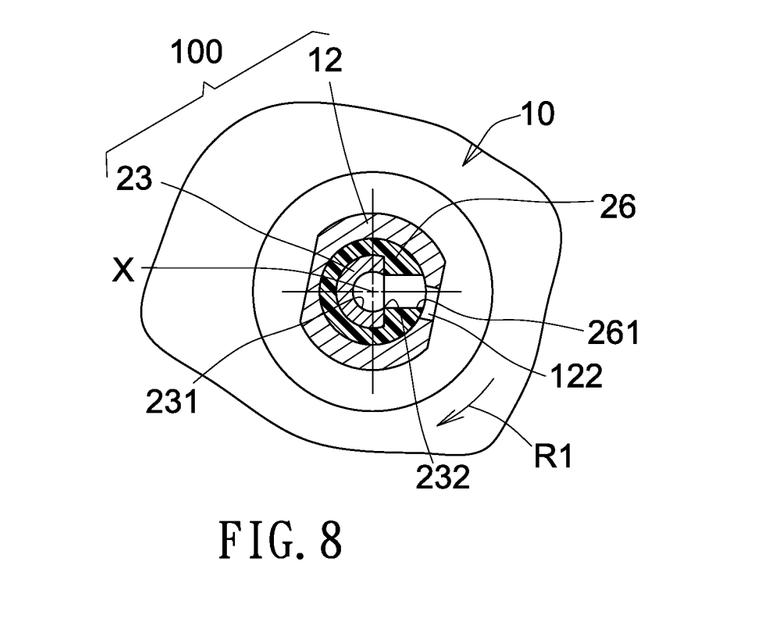
FIG. 8 shows a partial opening state by rotating the upper coupling member in direction R1 for partially opening the valve means of the present invention.

When the upper coupling member 10 is rotated in direction R1 as shown in FIGS. 4 and 8, the outer hole 122 is partially closed by the packing sleeve 26 as shown in FIG. 8.

Figure 9:
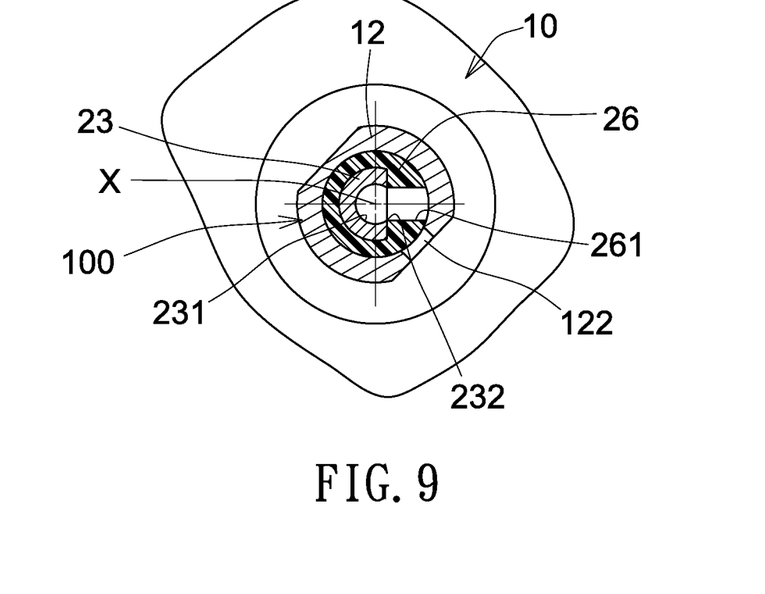
FIG. 9 shows a closed state by closing the valve means of the present invention.

When the upper coupling member 10 is further rotated in direction R1 as shown in FIG. 9, the outer hole 122 is completely closed or shielded by the packing sleeve 26 and the passage through the holes 122, 261, 232 and 231 are now closed to prevent ice water drainage through the holes as above-mentioned.

Figure 7:
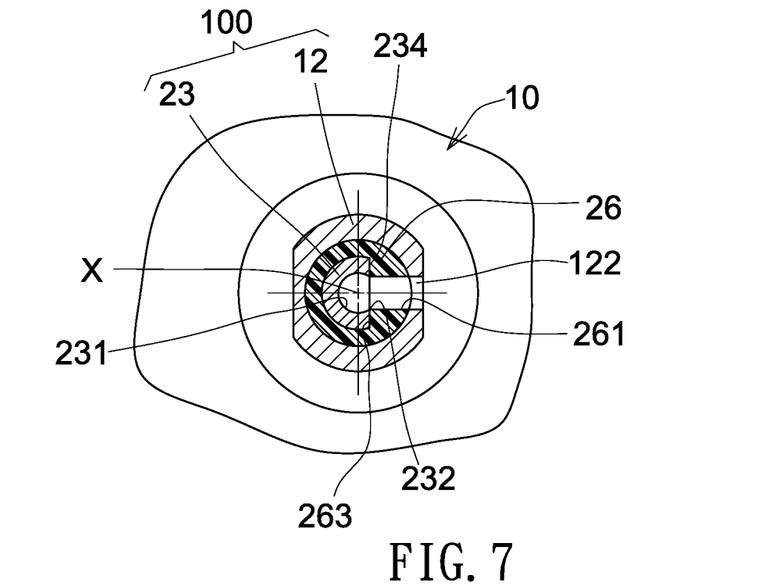
FIG. 7 is a cross-sectional drawing as viewed from 7-7 direction of FIG. 4, showing a fully opening state of the valve means.

The inner horizontal hole 122 of the sheath 121 is positioned adjacent to the bottom of the ice container 11 to drain the ice water downwardly through the outer hole 122, the middle hole 261, the inner hole 232 and the vertical hole 231 as shown in FIGS. 7 and 6 to brew coffee 40 as stored in the coffee jug 21.

For preventing the decoupling or separation of the upper and lower coupling members 10, 20, a retaining (or limiting) pin 25 is inserted in socket member 20a to be protruded inwardly into an annular groove 161 concentrically formed in the shaft 16 of the upper coupling member 10, whereby the shaft 16 and the basin 10a may be rotated relative to the socket member 20a, but without being separated or removed as rotatably limited by the retaining (or limiting) pin 25. The above-mentioned pin 25 may be a limiting bolt for rotatably limiting the upper and lower coupling members 10, 20.

When rotating the basin 10a of upper coupling member 10 in direction R1 (FIGS. 4, 8) to open the holes, the basin 10a will serve as a "valve handle" for opening the dripping valve means 100. Similarly, the socket member 20a may also serve as a "valve handle" and be rotated in direction R2 (FIG. 4) to open the valve means 100. The numerals R1, R2 respectively indicate the relative rotation directions of the upper and lower coupling members 10, 20 for opening the valve means 100 of the present invention. An opening-closing indication or stopper (not shown) for indicating or reminding a rotation (R1 or R2) end-point may be provided on a suitable location of the present invention.

Figure 10:
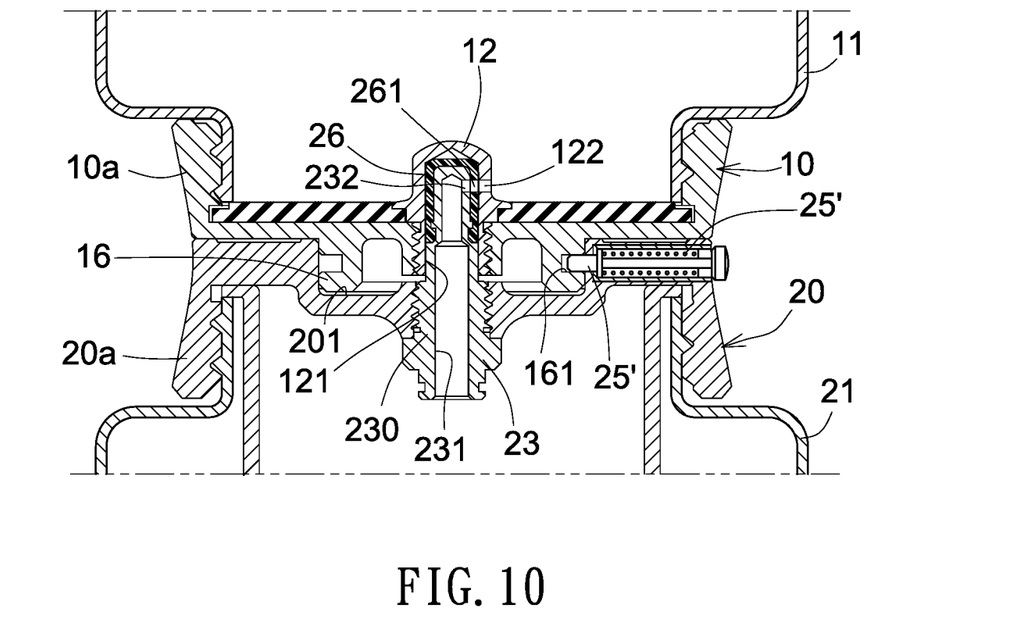
FIG. 10 shows a resilient retaining pin for rotatably coupling the upper and lower coupling members of the present invention.

The retaining pin 25 may be modified to be a resilient retaining pin 25' as shown in FIG. 10, provided with a tensioning spring 25s to urge the retaining pin 25' radially inwardly to resiliently couple the shaft 16 of the upper coupling member 10 with the recess portion 201 in the lower coupling member 20.

Figure 11:
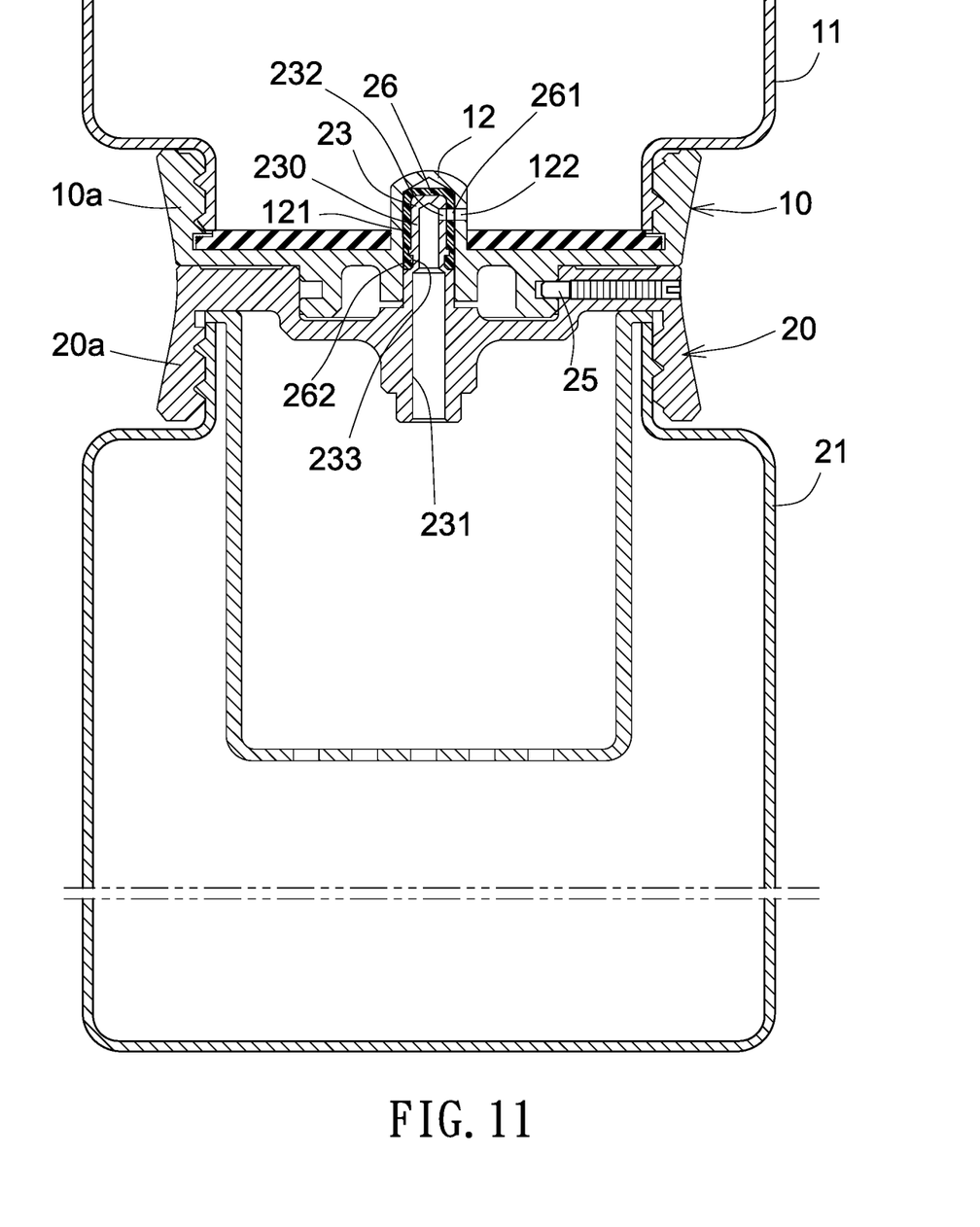
FIG. 11 shows another preferred embodiment of the present invention.

In FIG. 11, the upper valve member 12 is integrally formed with the upper coupling member 10, and the valve stem 230 is integrally formed with the lower coupling member 20.

When using the present invention as shown in FIG. 6, the ice water as melted from the ice 30 stored in the ice container 11 will be drained horizontally through the outer hole 122 of upper valve member 12, the middle hole 261 and the inner hole 232 of the lower valve member 23, and then drained vertically through the vertical hole 231 formed in the valve stem 230 to brew ground coffee 40 as stored in the canister 22, whereby the drip ice coffee as brewed through the canister 22 will be drained downwardly through holes 221 to be received in the coffee jug 21, ready for serving ice drip coffee drink.

The present invention has the following advantages superior to the prior arts:

1. Just rotating the upper or lower coupling member 10, 20, a dripping rate of the ice water can be conveniently adjusted or controlled, without dismantling the related parts of a coffee maker.
2. The user will not contact the ice water or ice coffee as brewed by the present invention since all valve elements are mounted within the coffee maker, being better for hygienic use.
3. The ice, ice water, ground coffee and the brewed coffee are confined within the coffee maker, not exposed to the environment, thereby preventing from contamination by external pollutants.

4. Either basin 10*a* of upper coupling member 10 or socket member 20*a* of lower coupling member 20 may be served as a "valve handle" for operating the valve means 100 in a lighter force-saving way or an ergonomic way.

5. The ice water in the upper ice container will first be drained horizontally through holes 122, 261, 232, and then drained vertically through hole 231 to thereby slow down its draining rate due to friction loss between the fluid (ice water) flow and the walls of the valve elements. In other words, the ice water as thus dripped will be gradually slowly dripped into the ground coffee in the canister for a thorough extraction of the coffee (for a complete dissolving of coffee in the ice water) for brewing a nice-flavor ice coffee drink.

The present invention may be further modified without departing from the spirit and scope of the present invention.

I claim:

1. An ice-water dripping-rate adjuster for drip-type ice coffee maker, comprising:

a dripping valve means for adjusting a dripping rate of ice water for making drip-type ice coffee, including an upper valve member, and a lower valve member;

an upper coupling member including a basin circumferentially disposed about said upper valve member, adapted for mounting an ice or ice water container on said basin for storing ice and ice water in said ice or ice water container; with said upper valve member axially secured in said basin for draining ice water inwardly and downwardly into said lower valve member;

a lower coupling member including a socket member circumferentially disposed about said lower valve member, with said lower valve member axially secured in said socket member, said socket member rotatably engageable with said basin of said upper coupling member for opening or closing said dripping valve means and adapted for mounting a coffee jug under said socket member, with said coffee jug including a ground coffee canister mounted in an upper portion of said coffee jug and secured under said dripping valve means, whereby the ice water is downwardly dripped and controlled by said dripping valve means and downwardly dripped through said canister to brew coffee which is received in said coffee jug, wherein said ice or ice water container is mounted inside said basin of said upper coupling member, and said coffee jug is mounted inside said socket member of said lower coupling member, and wherein one of said upper coupling member and said lower coupling member is moved directly in rotation relative to another to control said dripping valve means.

2. The ice-water dripping-rate adjuster according to claim 1, wherein said basin of said upper coupling member includes an upper cavity formed in an upper portion of said basin adapted to be secured with said ice or ice water container; and said socket member of said lower coupling member includes a lower cavity formed in a lower portion of said socket member adapted to be secured with said coffee jug.

3. The ice-water dripping-rate adjuster according to claim 1, wherein said upper valve member of said dripping valve means includes a sheath axially formed in said basin of said upper coupling member, having an outer horizontal hole formed through said sheath for draining ice water from said ice or ice water container into said lower valve member; and said upper valve member is secured to or formed with said basin of said upper coupling member.

4. The ice-water dripping-rate adjuster according to claim 3, wherein said upper valve member is integrally formed with said basin.

5. The ice-water dripping-rate adjuster according to claim 3, wherein said upper valve member is secured to said basin by forming a male-threaded portion on said upper valve member to be engaged with a female-threaded hole formed in said basin.

6. The ice-water dripping-rate adjuster according to claim 1, wherein said lower valve member includes: a valve stem formed in said socket member of said lower coupling member, a vertical hole formed in said valve stem, an inner horizontal hole formed through an upper portion of said valve stem and fluidically communicated with said vertical hole in said valve stem, a packing sleeve jacketed on an upper portion of the valve stem to be positioned between the valve stem and a sheath of said upper valve member and having a middle horizontal hole formed through said packing sleeve to be fluidically communicated with an outer horizontal hole formed in said sheath of said upper valve member when opening said dripping valve means to drain or drip the ice water downwardly to be controlled by said dripping valve means for adjusting the dripping rate of ice water, which is then dripped through said canister into said coffee jug.

7. The ice-water dripping-rate adjuster according to claim 6, wherein said valve stem is integrally formed with said socket member of said lower coupling member.

8. The ice-water dripping-rate adjuster according to claim 6, wherein said valve stem is formed with a male-threaded portion to be engaged with a female-threaded hole formed in said socket member of said lower coupling member.

9. The ice-water dripping-rate adjuster according to claim 6, wherein said valve stem is formed with a flange groove therein to be engaged with a flange circumferentially formed on the packing sleeve as jacketed on said valve stem.

10. The ice-water dripping-rate adjuster according to claim 6, wherein said valve stem includes a flat or secant surface portion formed on a top portion of said stem to be engaged with a corresponding flat surface portion formed on said packing sleeve to prevent a free rotation of said packing sleeve on said valve stem.

11. The ice-water dripping-rate adjuster according to claim 1, wherein said basin of said upper coupling member includes a shaft which is formed with an annular groove concentrically formed in said shaft, with said shaft protruding downwardly from said basin; and a retaining pin formed in said socket member of said lower coupling member and inserted into said annular groove in said shaft for rotatably limiting said shaft of said basin for preventing separation of said upper coupling member from said lower coupling member.

12. The ice-water dripping-rate adjuster according to claim 11, wherein said retaining pin is selected from a limiting bolt protruding inwardly into said annular groove; or a resilient retaining pin having a tensioning spring resiliently urging said pin inwardly through said annular groove, said limiting bolt or said resilient retaining pin inserted into said annular groove for preventing separation of said upper and lower coupling members as rotatably coupled with each other.

* * * * *